(12) United States Patent
Yeh

(10) Patent No.: US 10,444,875 B2
(45) Date of Patent: Oct. 15, 2019

(54) TOUCH SENSITIVE PROCESSING APPARATUS, METHOD AND SYSTEM

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 32 days.

(21) Appl. No.: 15/991,489

(22) Filed: May 29, 2018

(65) Prior Publication Data

US 2018/0348901 A1 Dec. 6, 2018

Related U.S. Application Data

(60) Provisional application No. 62/512,221, filed on May 30, 2017.

(51) Int. Cl.
| | |
|---|---|
| *G06F 3/041* | (2006.01) |
| *G06F 3/0354* | (2013.01) |
| *G06F 3/044* | (2006.01) |

(52) U.S. Cl.
CPC .......... *G06F 3/041* (2013.01); *G06F 3/03545* (2013.01); *G06F 3/044* (2013.01); *G06F 3/0416* (2013.01); *G02F 2201/12* (2013.01)

(58) Field of Classification Search
CPC .... G06F 3/041; G06F 3/03545; G06F 3/0416; G06F 3/044; G02F 2201/12
See application file for complete search history.

(56) References Cited

U.S. PATENT DOCUMENTS

| | | | | |
|---|---|---|---|---|
| 9,013,429 | B1* | 4/2015 | Krekhovetskyy ... | G06F 3/03545 345/173 |
| 9,086,745 | B2* | 7/2015 | Sundara-Rajan ....... | G06F 3/038 |
| 9,189,121 | B2* | 11/2015 | Shahparnia ............. | G06F 3/046 |
| 9,250,719 | B2* | 2/2016 | Shahparnia ......... | G06F 3/03545 |
| 9,557,833 | B2* | 1/2017 | Sundara-Rajan ..... | G06F 3/0412 |
| 9,823,768 | B2* | 11/2017 | Chang ................... | G06F 3/0416 |
| 2013/0106713 | A1* | 5/2013 | Shahparnia ........... | G06F 3/0416 345/173 |
| 2013/0106715 | A1* | 5/2013 | Shahparnia ......... | G06F 3/03545 345/173 |
| 2013/0106718 | A1* | 5/2013 | Sundara-Rajan ... | G06F 3/03545 345/173 |
| 2013/0106795 | A1* | 5/2013 | Sundara-Rajan ..... | G06F 3/0412 345/179 |

(Continued)

*Primary Examiner* — Peter D McLoone
(74) *Attorney, Agent, or Firm* — WPAT, PC

(57) ABSTRACT

The present invention provides a touch sensitive processing method including: having a sensing circuit of a touch sensitive processing apparatus sense an electrical signal emitted from a transmitter via multiple first electrodes according to a first sensing parameter to generate multiple first sensing results and sense the electrical signal via multiple second electrodes according to a second sensing parameter to generate multiple second sensing results; calculating a second coordinate value of the transmitter with respect to a second axis according to the first sensing results; calculating a first coordinate value of the transmitter with respect to a first axis according to the second sensing results; setting the second sensing parameter according to the second coordinate value; and setting the first sensing parameter according to the first coordinate value.

25 Claims, 5 Drawing Sheets

(56) References Cited

U.S. PATENT DOCUMENTS

2013/0321330 A1* 12/2013 Chang .................... G06F 3/044
                                                                             345/174
2017/0010699 A1* 1/2017 Shahparnia ......... G06F 3/03545

* cited by examiner

TOUCH SENSITIVE PROCESSING APPARATUS, METHOD AND SYSTEM

CROSS REFERENCE TO RELATED APPLICATIONS

This application claims priority to U.S. provisional patent application 62/512,221, filed on May 30, 2017, the disclosure of which is incorporated herein by reference.

BACKGROUND OF THE INVENTION

1. Field of the Invention

The present invention relates to the field of touch sensitive system, and more particularly, to a touch sensitive system for styluses.

2. Description of the Prior Art

Touch sensitive panels or screens (thereinafter touch sensitive screens) have already been one of main input/output devices of modern electronic systems. Also, more and more touch sensitive screens can detect styluses to increase input flexibility and choices to users.

Referring to FIG. 1, it shows a touch sensitive system 100. The touch sensitive system 100 may adapt to the above-mentioned electronic systems. It includes a touch sensitive screen 110 and a touch sensitive processing apparatus 130 connecting to the touch sensitive screen 110. The touch sensitive screen 110 includes multiple first electrodes 111 being parallel to a first axis (such as a horizontal axis) and multiple second electrodes 112 being parallel to a second axis (such as a vertical axis). Multiple sensing points are located where the intersections of these two electrodes 111 and 112. The touch sensitive processing apparatus 130 connects to the electrodes 111 and 112 to perform self-capacitance and/or mutual-capacitance touch sensing.

Additionally, the touch sensitive system 100 may further include a stylus 120. The stylus 120 may emit electrical signal actively and may also emit electrical signal in responsive to a triggering condition. The touch sensitive processing apparatus 130 may detect the electrical signal by the first and the second electrodes 111 and 112 to determine a position of the stylus 120 on the touch sensitive screen 110.

Referring to FIG. 2, which is a diagram shows a touch sensitive processing apparatus 130 to detect electrical signal via the first electrodes 111 and the second electrodes 112. A stylus 120 emits the electrical signal at a position 201. The touch sensitive processing apparatus 130 performs detection via the first electrodes 111 and gets signal strength values of detected electrical signal to form a first one-dimensional sensing information 210. Similarly, the touch sensitive processing apparatus 130 performs detection via the second electrodes 112 and gets signal strength values of detected electrical signal to form a second one-dimensional sensing information 220.

The touch sensitive processing apparatus 130 can calculate a coordinate value of the second axis (vertical axis) of the position 201 from the first one-dimensional sensing information 210. Similarly, the touch sensitive processing apparatus 130 can calculate a coordinate value of the first axis (horizontal axis) of the position 201 from the second one-dimensional sensing information 220. The position 201 may be shown by the coordinate values of these two axes, that is, they indicate the position of the stylus 120 related to the touch sensitive screen 110.

In some cases, the electrical signal emitted by the stylus 120 is very weak. For example, the tip of the stylus 120 emitting the electrical signal departs from the touch sensitive screen 110 or the stylus 120 is low powered. This makes signal-to-noise ratio (SNR) detected by the touch sensitive processing apparatus 130 be not good, and then causing error in calculating the position of the stylus 120.

As shown in FIG. 1, all first electrodes 111 connect to the touch sensitive processing apparatus 130 at below by the right side of the touch sensitive screen 110. If the position of the stylus 120 is closer to the right side of the touch sensitive screen 110, the circuit path for propagating the electrical signal is shorter. Reversely, in case the position of the stylus 120 is closer to the left side of the touch sensitive screen 110, the circuit path for propagating the electrical signal is longer. If the electrical signal needs to pass a longer circuit path, it has more chance to be disturbed by noise and then causing worse SNR.

Therefore, one of the problems the present invention intends to solve is how to enhance the SNR of received electrical signal to reduce the positioning error of the stylus 120. Also, if the electrical signal carries message of the stylus 120, the present invention intends to solve how to lower the chance for the touch sensitive processing apparatus 130 to mis-interpret the message.

SUMMARY OF THE INVENTION

According to an embodiment of the present invention, it provides a touch sensitive processing apparatus configured to connect with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing apparatus includes: a sensing circuit, sensing the electrical signal via the first electrodes according to a first sensing parameter to generate multiple first sensing results and sensing the electrical signal via the second electrodes according to a second sensing parameter to generate multiple second sensing results; and a processor connecting with the sensing circuit, reading and executing a program from a non-volatile memory. The program includes multiple instructions executed by the processor for performing the following steps: calculating a second coordinate value of the transmitter with respect to the second axis according to the first sensing results; calculating a first coordinate value of the transmitter with respect to the first axis according to the second sensing results; setting the second sensing parameter according to the second coordinate value; and setting the first sensing parameter according to the first coordinate value.

According to an embodiment of the present invention, it provides a touch sensitive processing apparatus configured to connect with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing apparatus includes: a sensing circuit, sensing the electrical signal via the first electrodes to generate multiple first sensing results and sensing the electrical signal via the second electrodes to generate multiple second sensing results; and a processor connecting with the sensing circuit, reading and executing a program from a non-volatile memory. The program includes multiple instructions executed by the processor for performing the following steps: calculating a second coordinate value of the transmitter with respect to the second axis according to the first sensing results adjusted by a first sensing parameter; calculating a first coordinate value of the transmitter with respect to the first axis according to the second sensing results adjusted by a second sensing parameter; setting the second sensing parameter according to the second coordinate value; and setting the first sensing parameter according to the first coordinate value.

According to an embodiment of the present invention, it provides a touch sensitive processing method being adaptive to a touch sensitive processing apparatus. The touch sensitive processing apparatus connects with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing method includes: having a sensing circuit of the touch sensitive processing apparatus sense the electrical signal via the first electrodes according to a first sensing parameter to generate multiple first sensing results and sense the electrical signal via the second electrodes according to a second sensing parameter to generate multiple second sensing results; calculating a second coordinate value of the transmitter with respect to the second axis according to the first sensing results; calculating a first coordinate value of the transmitter with respect to the first axis according to the second sensing results; setting the second sensing parameter according to the second coordinate value; and setting the first sensing parameter according to the first coordinate value.

According to an embodiment of the present invention, it provides a touch sensitive processing method being adaptive to a touch sensitive processing apparatus. The touch sensitive processing apparatus connects with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing method includes: having a sensing circuit of the touch sensitive processing apparatus sense the electrical signal via the first electrodes to generate multiple first sensing results and sense the electrical signal via the second electrodes to generate multiple second sensing results; calculating a second coordinate value of the transmitter with respect to the second axis according to the first sensing results adjusted by a first sensing parameter; calculating a first coordinate value of the transmitter with respect to the first axis according to the second sensing results adjusted by a second sensing parameter; setting the second sensing parameter according to the second coordinate value; and setting the first sensing parameter according to the first coordinate value.

According to an embodiment of the present invention, it provides a touch sensitive system including: a touch sensitive panel, including multiple first electrodes being parallel to a first axis and multiple second electrodes being parallel to a second axis; and the abovementioned touch sensitive processing apparatus.

To sum up, the present invention provides a technical solution that the touch sensitive processing apparatus may adjust the setting parameter(s) of the sensing circuit(s) according to the distance of circuit path on which the electrical signal propagating after determining the coordinate of the electrical signal emitted by the stylus. By doing so, the touch sensitive processing apparatus can get signals with better SNR to reduce the error in calculating the coordinates. Moreover, when the electrical signal including the message the stylus intends to transmit, the probability of error in transmitting the message can also be reduced.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
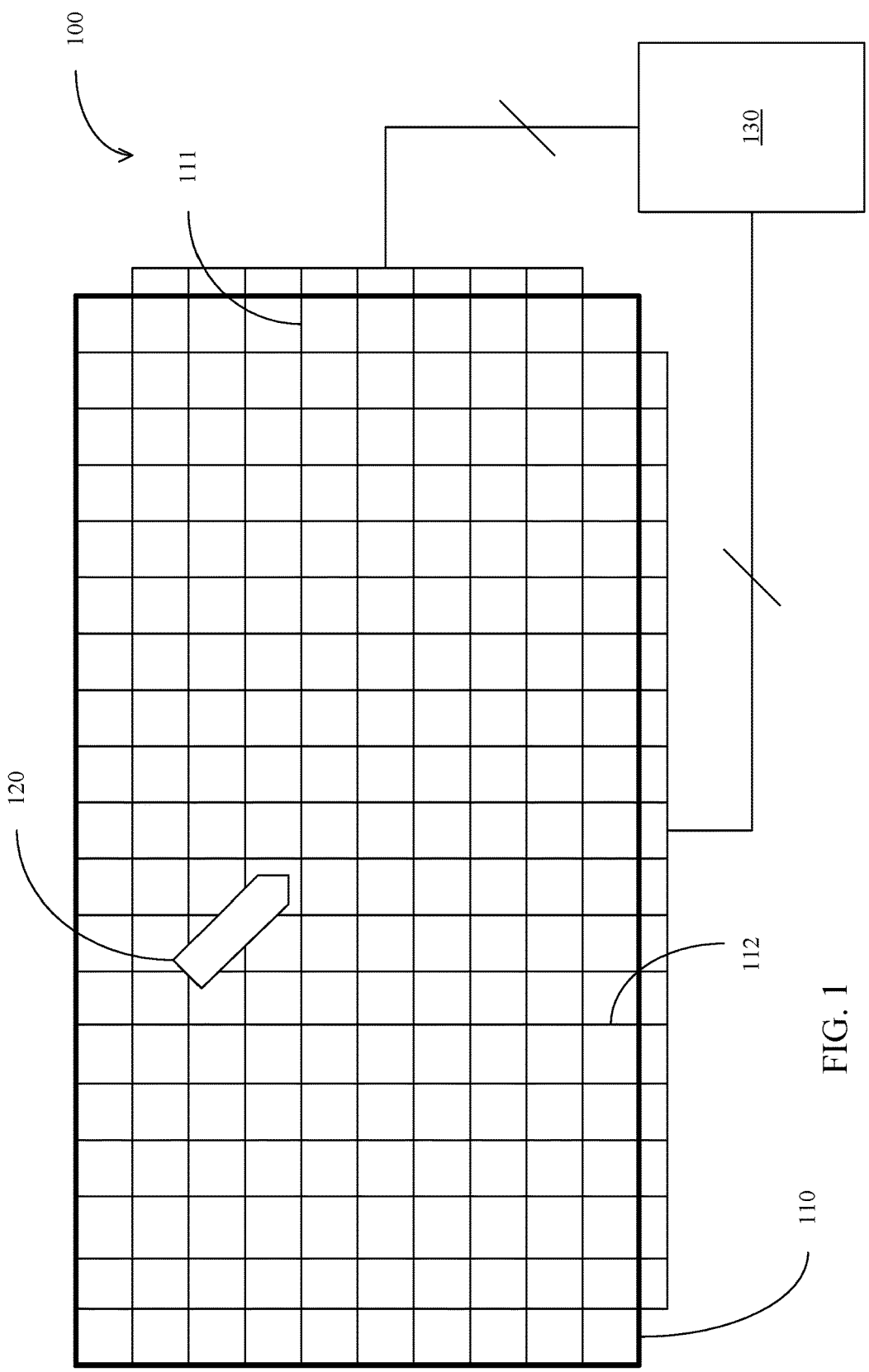
FIG. 1 shows a schematic diagram of a touch sensitive system.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

If any terms in this application conflict with terms used in any application(s) from which this application claims priority, or terms incorporated by reference into this application or the application(s) from which this application claims priority, a construction based on the terms as used or defined in this application should be applied.

Figure 3A:
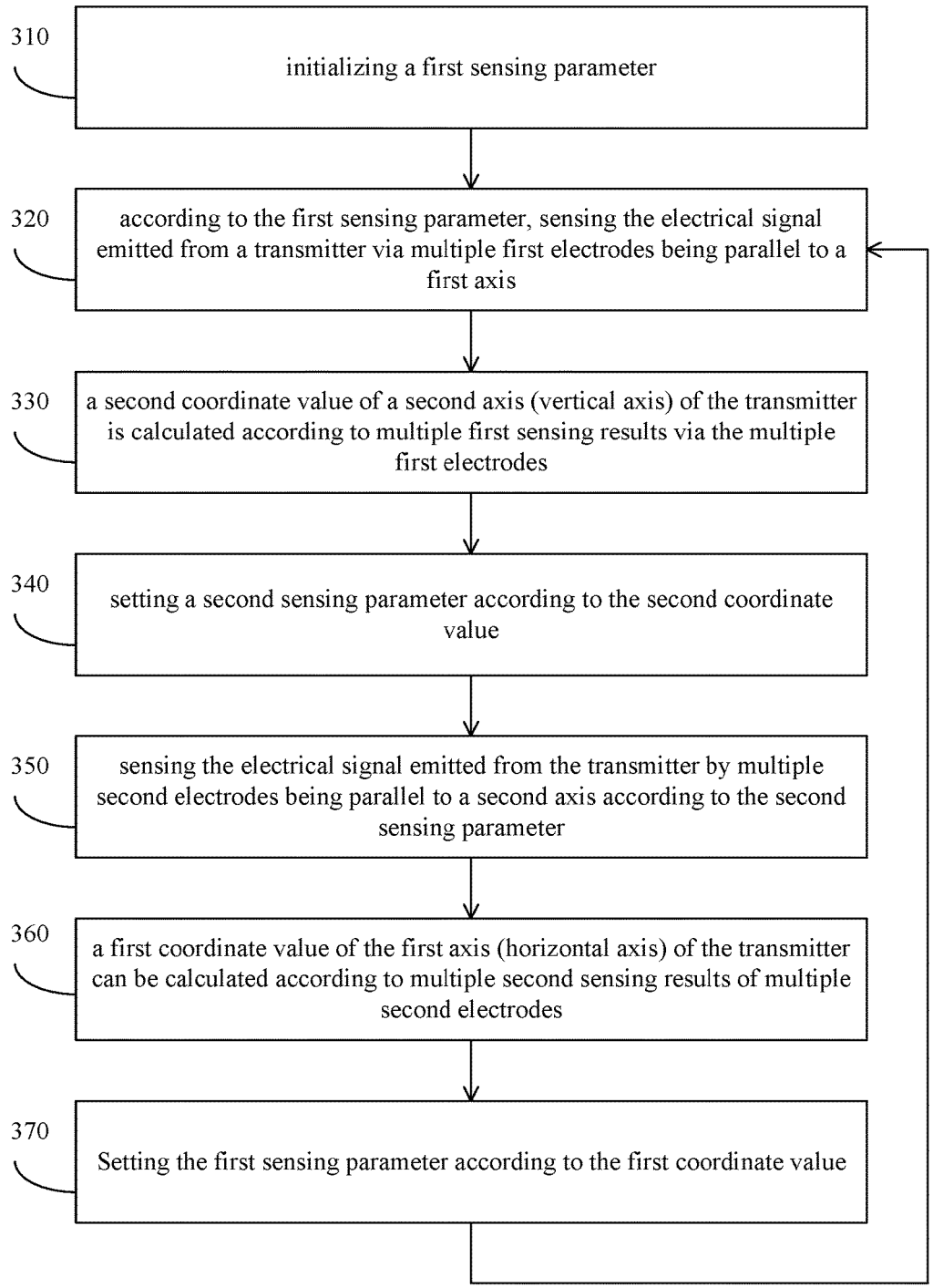
FIGS. 3A and 3B show flowcharts of sensing methods according to the embodiments of the present invention.

Referring to FIG. 3A, it shows a flowchart of a sensing method according to an embodiment of the present invention. The sensing method may be performed by the touch sensitive processing apparatus 130 shown in FIG. 1. In one embodiment, the touch sensitive processing apparatus 130 may include an analog front end (AFE) unit configured to connect to the first electrodes 111 and the second electrodes 112 mentioned above. The AFE unit may include an amplifier, a sampler, an integrator, and an analog-to-digital converter (ADC). The touch sensitive processing apparatus 130 may further include a digital signal processor (DSP) configured to demodulate the transformed digital sensing signal to detect the electrical signal with a certain frequency and the strength thereof.

In the abovementioned analog and digital signal processing, parameters may be set to those components. For example, integral duration and integral timing of the integrator of the AFE unit, gain coefficient of the amplifier, and signal gain value, signal delay timing and duration of the inner of the DSP. In other words, the parameter setting may be aimed at the AFE unit and also the DSP.

Figure 2:
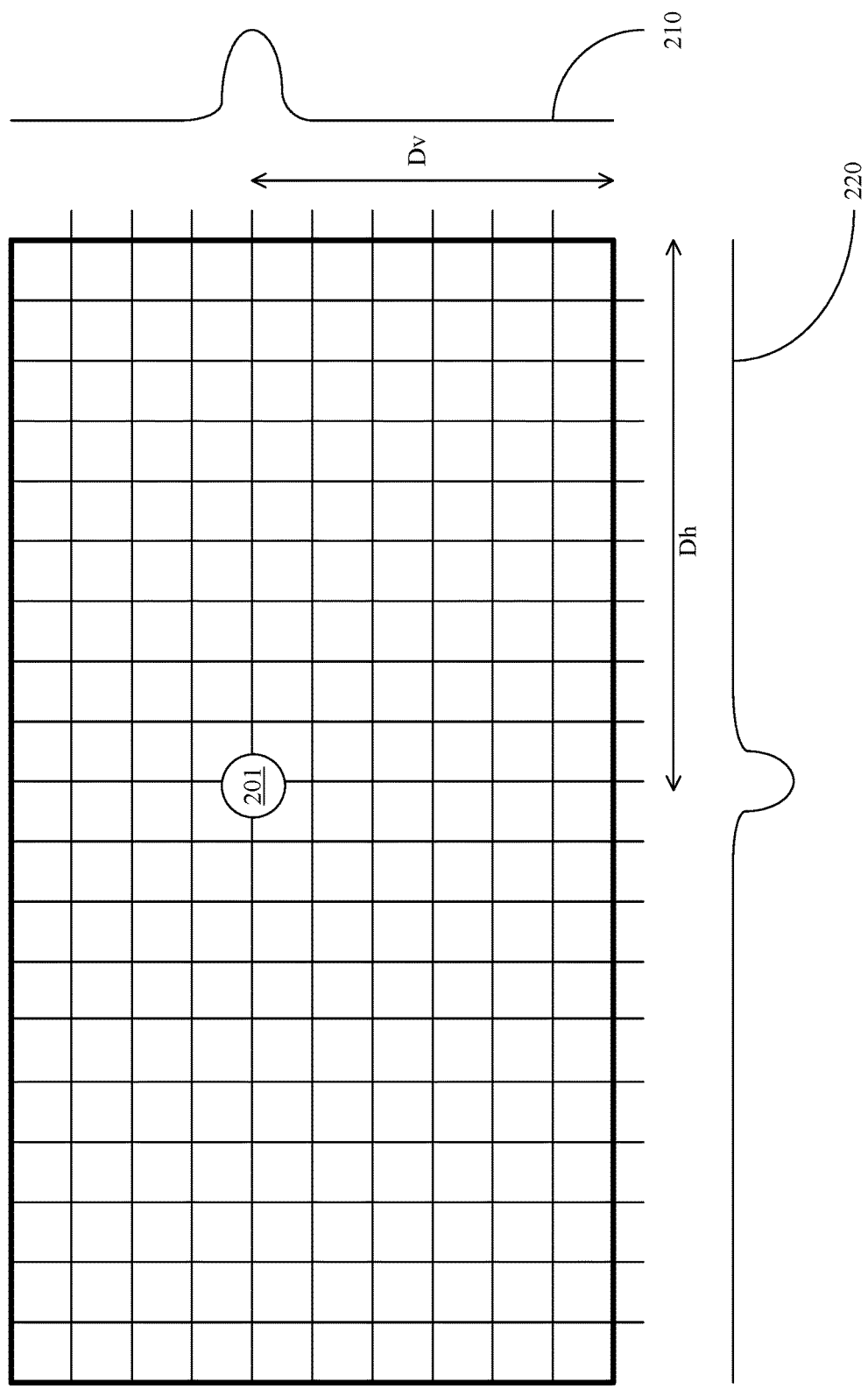
FIG. 2 shows a schematic diagram illustrating that the touch sensitive processing apparatus detects an electrical signal via the first electrodes and the second electrodes.

At the beginning of the flow, initializing a first sensing parameter firstly may be performed in step 310. The first sensing parameter may be one of the parameters mentioned above. In step 310, multiple first sensing parameters may be initialized as well. Then, in step 320, according to the first sensing parameter, sensing the electrical signal emitted from a transmitter via multiple first electrodes being parallel to a first axis is performed. Taking the examples shown in FIGS. 1 and 2, if the first electrodes 11 being parallel to the horizontal axis are used to sense the electrical signal, the first one-dimensional sensing information 210 shown in FIG. 2 will be received.

Therefore, in step 330, a second coordinate value of a second axis (vertical axis) of the transmitter is calculated according to multiple first sensing results via the multiple first electrodes, such as the first one-dimensional sensing information 210.

After the second coordinate value is in hand, the touch sensitive processing apparatus 130 knows how long the circuit path of the second electrode 112 is for the electrical signal emitted from the transmitter 120 being propagated to the sensing part of the touch sensitive processing apparatus. Since the distance of the circuit path is known, the touch sensitive processing apparatus 130, in step 340, may set a second sensing parameter according to the second coordinate value. The second sensing parameter is adjusted according to the distance of the circuit path to which the electrical signal propagates.

For example, if the circuit path for the electrical signal propagating is longer, the integral duration may be set longer, or the gain coefficient or the gain value may be increased. Also, since the circuit path is longer, the time for signal propagating takes longer too. Therefore, delaying the integral timing or postponing the delay duration may be considered. Reversely, if the circuit path for the electrical signal propagating is shorter, the integral duration may be set shorter, or the gain coefficient or the gain value may be reduced. Also, since the circuit path is shorter, the time for signal propagating takes shorter too. Therefore, maintaining the integral timing or advancing the delay duration may be considered.

In one embodiment, the second sensing parameter, such as the integral duration, the integral timing, the gain coefficient, and etc., may be obtained by using table lookup or may be known by interpolation calculation. For example, the touch sensitive processing apparatus 130 gets a lookup table of the second coordinate value relating to the second sensing parameter from a memory. According to the lookup table, the touch sensitive processing apparatus can get the setting value of the second sensing parameter according to the known second coordinate value and set the second sensing parameter. In another example, the touch sensitive processing apparatus 130 gets the maximum value and the minimum value of the second coordinate value and the maximum value and the minimum value of the second sensing parameter which correspond to the maximum value and the minimum value of the second coordinate value respectively from a memory. Then, it performs interpolation according to the second coordinate value to calculate and set the second sensing parameter. The abovementioned interpolation is linear. But, in another example, when the electrodes connect to the touch sensitive processing apparatus 130 via left and right sides or top and bottom sides, quadratic curve may be used to calculate the abovementioned second sensing parameter.

In one embodiment, the second sensing parameter includes any combination of the integral duration, the integral timing, and gain coefficient. In one embodiment, the second sensing parameter has predetermined value. When the second coordinate value is not obtained, the predetermined second sensing parameter can be used for sensing. The predetermined value may correspond to the middle position of the touch sensitive panel or screen, that is, an average value of the maximum value and the minimum value of the second coordinate value. In other words, the predetermined value may correspond to an average value of the maximum value and the minimum value of the second sensing parameter.

After setting the second sensing parameter, the flow goes to step 350. In step 350, sensing the electrical signal emitted from the transmitter by multiple second electrodes being parallel to a second axis according to the second sensing parameter is performed. Taking examples shown in FIGS. 1 and 2, if the second electrodes 112 being parallel to the vertical axis are used to sense the electrical signal, the first one-dimensional sensing information 220 shown in FIG. 2 will be received.

Then, in step 360, a first coordinate value of the first axis (horizontal axis) of the transmitter can be calculated according to multiple second sensing results of multiple second electrodes, such as the second one-dimensional sensing information 220.

Next, similar to step 340, in step 370, the first sensing parameter is set up according to the first coordinate value. In one embodiment, the first sensing parameter, such as integral duration, integral timing, gain coefficient, and so forth, may be obtained by using table lookup or may be known by calculating with interpolation or quadratic curve interpolation. In one embodiment, the first sensing parameter includes any combination of integral duration, integral timing, and gain coefficient. In one embodiment, the first sensing parameter has predetermined value. When the first coordinate value is not obtained, the predetermined first sensing parameter can be used for sensing. The predetermined value may correspond to the middle position of the touch sensitive panel or screen, that is, an average value of the maximum value and the minimum value of the first coordinate value. In other words, the predetermined value may correspond to an average value of the maximum value and the minimum value of the first sensing parameter. Subsequently, the flow may go to step 320 for next iteration.

In one embodiment, steps 370 and 340 may be performed each time before getting the one-dimensional sensing information 210 and 220. In another embodiment, step 370 may be just performed in response to the first coordinate value is detected to be changed, and step 340 may be just performed in response to the second coordinate value is detected to be changed. By doing so, operation time can be saved, and power consumption can be reduced.

In one embodiment, the stylus 120 emits the electrical signal in response to a certain triggering signal. For example, a beacon signal emitted from the touch sensitive processing apparatus 130 via the first electrodes 111 and/or the second electrodes 112. After a tip of the stylus 120 receives the beacon signal, it emits the electrical signal. And then, the touch sensitive processing apparatus 130 performs the abovementioned detection at certain timing after emitting the beacon signal.

In this embodiment, the time of emitting the beacon signal may be served as a reference timing thus the sensing parameters may include a delay timing of the electrical signal integration. At the certain delay timing after the reference timing, the AFE unit just performs sensing action. In another embodiment, a delay timing may be set to the DSP to make the DSP start to process received digital sensing signal(s) after the delay timing after the reference timing.

The present invention does not limit to that the beacon signal is only received by the tip of the stylus 120, other signals or synchronization mechanisms may be used to set up the abovementioned reference timing. For example, the stylus 120 may connect to the touch sensitive processing apparatus 130 by wire, and the electrical signal transmitted by the stylus 120 is provided by the touch sensitive processing apparatus 130 thus the touch sensitive processing apparatus 130 knows the reference timing. Accordingly, the delay timing or the beginning of the integral timing of the AFE unit and/or the DSP can be adjusted according to the reference timing and the first/second coordinate value(s) determined previously. In another embodiment, the stylus 120 may wirelessly link to the touch sensitive processing apparatus 130 and receives the latter's command(s) to emit the electrical signal. Therefore, the touch sensitive processing apparatus 130 knows the reference timing.

In one embodiment, the stylus 120 emits the electrical signal cyclically. Between every cycle, there is a time for stopping emitting the electrical signal. Therefore, the touch sensitive processing apparatus 130 can record the timing of the stylus 120 emitting the electrical signal last time or the timing of the stylus 120 stopping emitting the electrical signal as the reference timing.

Figure 3B:
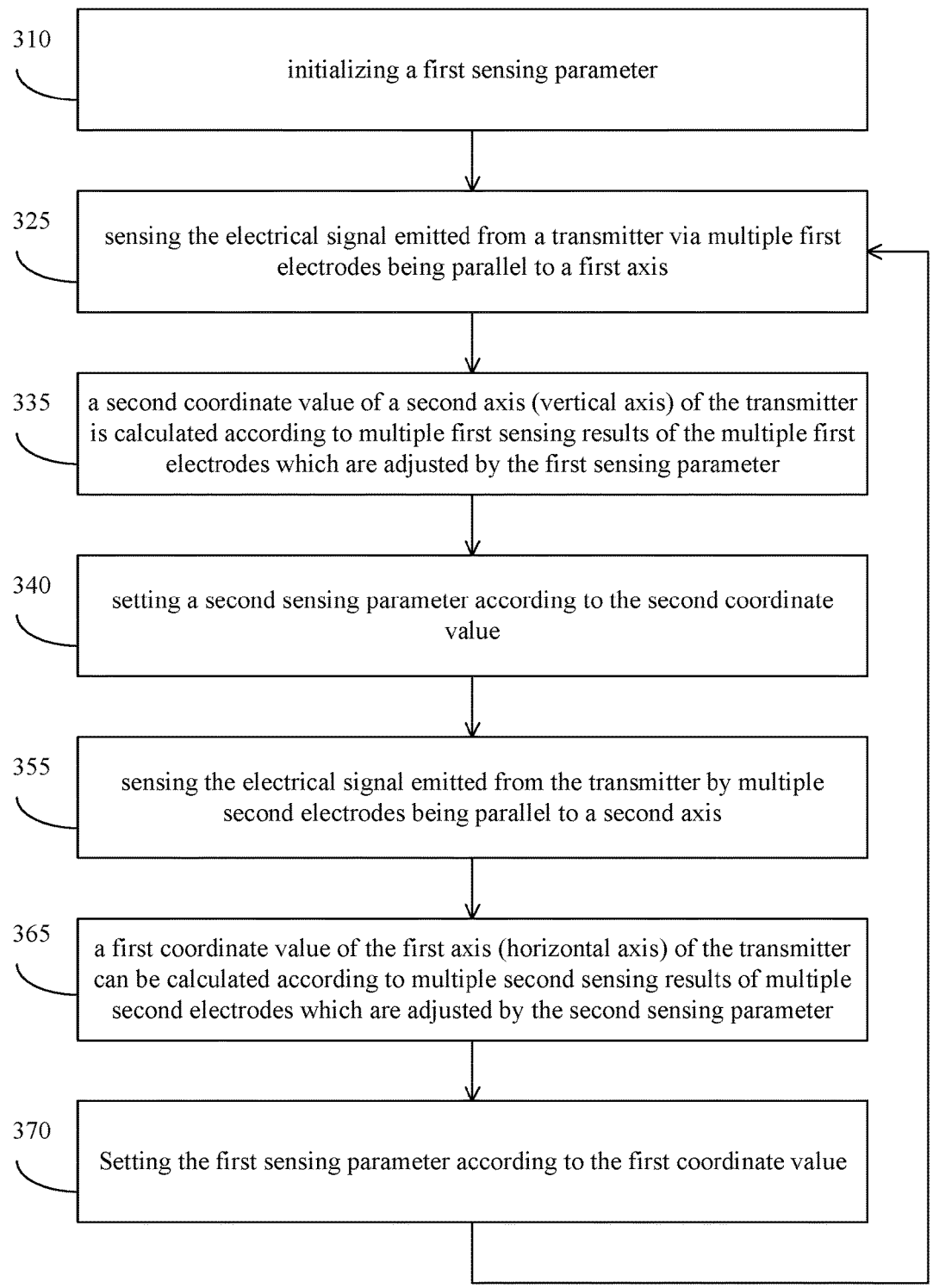

Referring to FIG. 3B, it shows a flowchart of a sensing method according to an embodiment of the present invention. The sensing method may be performed by the touch sensitive processing apparatus 130 shown in FIG. 1. FIG. 3A mainly aims to the AFE to adjust the sensing parameter, FIG. 3B principally aims to the digital back-end to adjust the sensing parameter.

In one embodiment, the DSP aims at sensing result of every electrode which can be multiple sampling digital accumulation value. In contrast to the gain coefficient of the analog amplifier, the digital gain value of the sensing result can be adjusted by the DSP. When the analog amplifier increases the gain coefficient, the digital gain value can be increased. In contrast to the integral duration of the analog integrator, the sampling number of the sensing result can be adjusted by the DSP. When the analog integrator increases the integral duration, the sampling number can be increased by the DSP. In contrast to the integral timing of the analog integrator, the sample which starts to be accumulated can be adjusted by the DSP. When the analog integrator advances the integral timing, the DSP advances starting to accumulate sample; when the analog integrator postpones the integral timing, the DSP delays starting to accumulate sample.

At the beginning of the flow, initializing a first sensing parameter firstly may be performed in step 310. The first sensing parameter may be one of the parameters mentioned above. In step 310, multiple first sensing parameters may be initialized as well. Then, in step 325, sensing the electrical signal emitted from a transmitter via multiple first electrodes being parallel to a first axis is performed. Taking the examples shown in FIGS. 1 and 2, if the first electrodes 111 being parallel to the horizontal axis are used to sense the electrical signal, the first one-dimensional sensing information 210 shown in FIG. 2 will be received.

Therefore, in step 335, a second coordinate value of a second axis (vertical axis) of the transmitter is calculated according to multiple first sensing results of the multiple first electrodes which are adjusted by the first sensing parameter.

After the second coordinate value is in hand, the touch sensitive processing apparatus 130 knows how long the circuit path of the second electrode 112 is for the electrical signal emitted from the transmitter 120 being propagated to the sensing part of the touch sensitive processing apparatus. Since the distance of the circuit path is known, the touch sensitive processing apparatus 130, in step 340, may set a second sensing parameter according to the second coordinate value. The second sensing parameter is adjusted according to the distance of the circuit path to which the electrical signal propagates.

For example, if the circuit path for the electrical signal propagating is longer, the sampling number may be increased, or the gain value may be increased. Also, since the circuit path is longer, the time for signal propagating takes longer too. Therefore, delaying starting to accumulate sample may be considered. Reversely, if the circuit path for the electrical signal propagating is shorter, the sampling number may be reduced, or the gain value may be reduced. Also, since the circuit path is shorter, the time for signal propagating takes shorter too. Therefore, advancing starting to accumulate sample may be considered.

In one embodiment, the second sensing parameter, such as the sampling number, the accumulation-starting sample, the gain value, and etc., may be obtained by using table lookup or may be known by interpolation calculation or according to quadratic curve calculation. For example, the touch sensitive processing apparatus 130 gets a lookup table of the second coordinate value relating to the second sensing parameter from a memory. According to the lookup table, the touch sensitive processing apparatus can get the setting value of the second sensing parameter according to the known second coordinate value and set the second sensing parameter. In another example, the touch sensitive processing apparatus 130 gets the maximum value and the minimum value of the second coordinate value and the maximum value and the minimum value of the second sensing parameter which correspond to the maximum value and the minimum value of the second coordinate value respectively from a memory. Then, it performs interpolation according to the second coordinate value to calculate and set the second sensing parameter. The abovementioned interpolation is linear. But, in another example, when the electrodes connect to the touch sensitive processing apparatus 130 via left and right sides or top and bottom sides, quadratic curve may be used to calculate the abovementioned second sensing parameter.

In one embodiment, the second sensing parameter includes any combination of the sampling number, the accumulation-starting sample, and the gain value. In one embodiment, the second sensing parameter has predetermined value. When the second coordinate value is not obtained, the predetermined second sensing parameter can be used for sensing. The predetermined value may correspond to the middle position of the touch sensitive panel or screen, that is, an average value of the maximum value and the minimum value of the second coordinate value. In other words, the predetermined value may correspond to an average value of the maximum value and the minimum value of the second sensing parameter.

After setting the second sensing parameter, the flow goes to step 355. In step 355, sensing the electrical signal emitted from the transmitter by multiple second electrodes being parallel to a second axis is performed. Taking examples shown in FIGS. 1 and 2, if the second electrodes 112 being parallel to the vertical axis are used to sense the electrical signal, the first one-dimensional sensing information 220 shown in FIG. 2 will be received.

Then, in step 365, a first coordinate value of the first axis (horizontal axis) of the transmitter can be calculated according to multiple second sensing results of multiple second electrodes which are adjusted by the second sensing parameter.

Next, similar to step 340, in step 370, the first sensing parameter is set up according to the first coordinate value. In one embodiment, the first sensing parameter, such as sampling number, accumulation-starting sample, gain value, and so forth, may be obtained by using table lookup or may be known by calculating with interpolation or quadratic curve interpolation. In one embodiment, the first sensing parameter has predetermined value. When the first coordinate value is not obtained, the predetermined first sensing parameter can be used for sensing. The predetermined value may correspond to the middle position of the touch sensitive panel or screen, that is, an average value of the maximum value and the minimum value of the first coordinate value. In other words, the predetermined value may correspond to an average value of the maximum value and the minimum value of the first sensing parameter. Subsequently, the flow may go to step 325 for next iteration.

Figure 4:
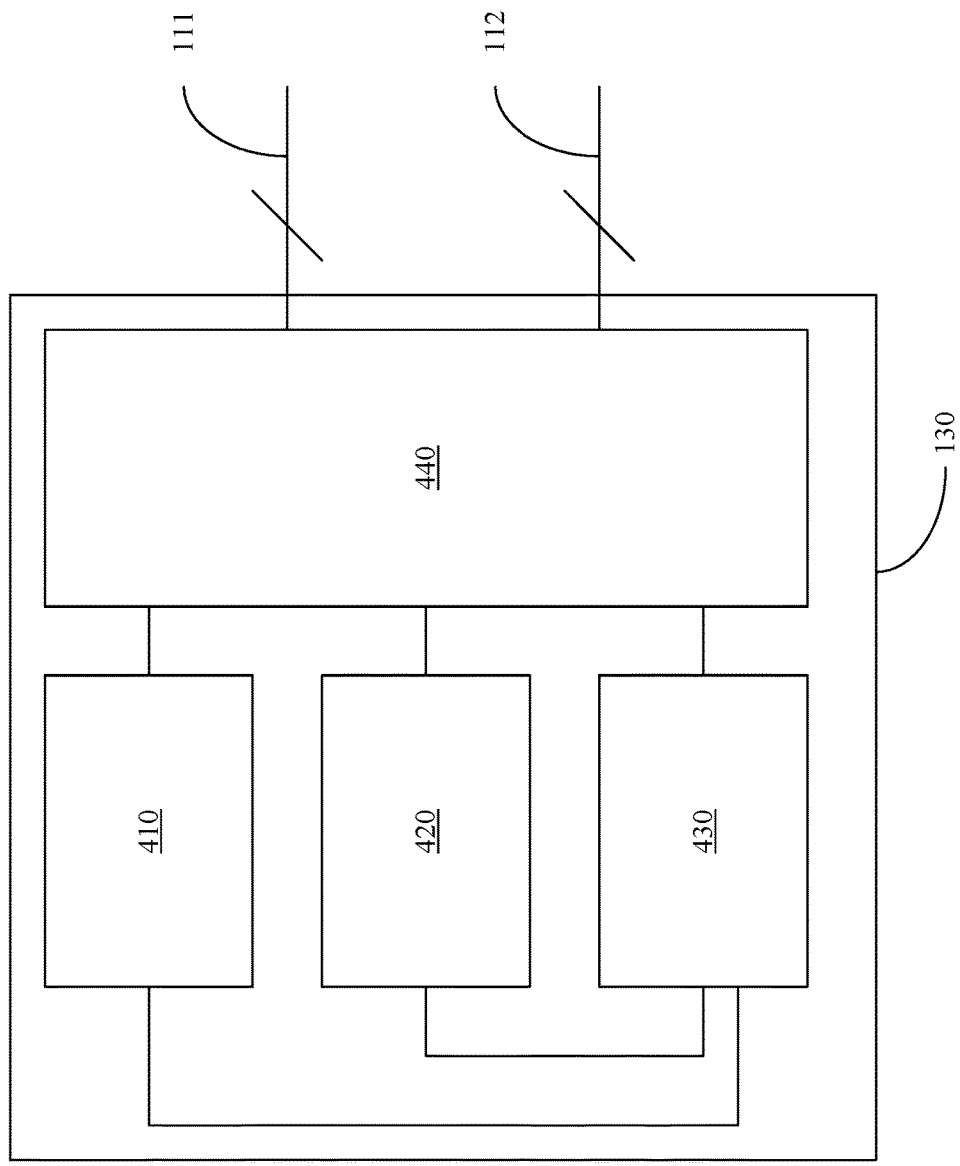
FIG. 4 shows a schematic diagram of a touch sensitive processing apparatus according to an embodiment of the present invention.

Referring to FIG. 4, a schematic diagram of a touch sensitive processing apparatus 130 according to an embodiment of the present invention is illustrated. The touch sensitive processing apparatus 130 includes a driving circuit 410, a sensing circuit 420, a processor 430, and an interconnection network 440. The processor 430 may include a microprocessor or an embedded processor for performing software or firmware to control the driving circuit 410, the sensing circuit 420 and the interconnection network 440. The interconnection network 440 is controlled by the processor 430 to selectively connect at least one first electrode 111 or second electrode 112 to the driving circuit 410 or the sensing circuit 420. The sensing circuit 420 may connect to different first electrodes 111 or second electrodes 112 respectively for performing sensing simultaneously to those the sensing circuit 420 connects to. In one embodiment, the sensing circuit 420 may simultaneously connect to all the first electrodes 111 to perform sensing. In another embodiment, the sensing circuit 220 may simultaneously connect to all the second electrodes 112 to perform sensing.

The sensing circuit 420 as being the AFE may include a component such as a sampler, an amplifier, an integrator, an ADC, and so on. In an embodiment of the present invention, the sensing circuit 420 may adjust the component mentioned above according to different sensing parameters. For example, the integral duration and the integral timing for the integrator, the gain coefficient for the amplifier, and so forth. In another embodiment of the present invention, the sensing circuit 420 may perform sensing according to the same sensing parameter and the back-end processor 430 performs adjustment. For the sensing of each electrode 111 or 112, the sensing circuit 420 provides multiple samples as sensing results to transmit to the processor 430 in the type of digital value. The processor 430 performs adjustment for every electrode's sensing result according to different sensing parameters to find out coordinate value. For example, a certain electrode's sensing result may include multiple samples in an accumulated value. The processor 430 may adjust the number of the sample, for example, from three samples to four samples. The processor 430 may also adjust the sample which starts to be accumulated, for example, such as changing the third sample to the fourth sample. The processor 430 may still adjust digital gain value. For example, the accumulated value multiplies by a coefficient and the coefficient may be the abovementioned digital gain value. The abovementioned sampling number, accumulation-starting sample, and digital gain value may be as the sensing parameters described above.

According to an embodiment of the present invention, it provides a touch sensitive processing apparatus configured to connect with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing apparatus includes: a sensing circuit, sensing the electrical signal via the first electrodes according to a first sensing parameter to generate multiple first sensing results and sensing the electrical signal via the second electrodes according to a second sensing parameter to generate multiple second sensing results; and a processor connecting with the sensing circuit, reading and executing a program from a non-volatile memory. The program includes multiple instructions executed by the processor for performing the following steps: calculating a second coordinate value of the transmitter with respect to the second axis according to the first sensing results; calculating a first coordinate value of the transmitter with respect to the first axis according to the second sensing results; setting the second sensing parameter according to the second coordinate value; and setting the first sensing parameter according to the first coordinate value.

In one embodiment, for adjusting the sensing parameter of the AFE, the sensing circuit further includes an amplifier and an integrator. The first sensing parameter or the second sensing parameter includes one of or any combination of the following parameters: the integral duration of the integrator, the integral timing of the integrator, and the gain coefficient of the amplifier.

According to an embodiment of the present invention, it provides a touch sensitive processing apparatus configured to connect with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing apparatus includes: a sensing circuit, sensing the electrical signal via the first electrodes to generate multiple first sensing results and sensing the electrical signal via the second electrodes to generate multiple second sensing results; and a processor connecting with the sensing circuit, reading and executing a program from a non-volatile memory. The program includes multiple instructions executed by the processor for performing the following steps: calculating a second coordinate value of the transmitter with respect to the second axis according to the first sensing results adjusted by a first sensing parameter; calculating a first coordinate value of the transmitter with respect to the first axis according to the second sensing results adjusted by a second sensing parameter; setting the second sensing parameter according to the second coordinate value; and setting the first sensing parameter according to the first coordinate value.

In one embodiment, for adjusting digital back-end sensing parameter, the first sensing parameter or the second sensing parameter includes one of or any combination of the following parameters: the sampling number for each of the first sensing results, the sampling number for each of the second sensing results, the accumulation-starting sample for each of the first sensing results, the accumulation-starting sample for each of the second sensing results, the digital gain value for each of the first sensing results, and the digital gain value for each of the second sensing results.

In one embodiment, for providing initial value of sensing parameter, the processor is further used to perform one of the following steps: initializing the first sensing parameter firstly when the first coordinate value has not obtained; and initializing the second sensing parameter firstly when the second coordinate value has not obtained.

In one embodiment, for reducing the error of initial value, the initial value of the first sensing parameter is an average value of a maximum value and a minimum value of the first sensing parameter, the initial value of the second sensing parameter is an average value of a maximum value and a minimum value of the second sensing parameter.

In one embodiment, for providing counting reference of integral timing of the AFE, the processor is further used to perform the following steps: sending a synchronous signal to the stylus at a reference timing, wherein the integral timing of the integrator is a time point of a certain period after the reference timing.

In one embodiment, for providing accumulation-starting reference of sample of digital back-end, the processor is further used to perform the following step: sending a synchronous signal to the stylus at a reference timing, wherein the accumulation-starting sample of the first sensing results or the second sensing results is the sample which starts to be sampled at a certain period after the reference timing.

In one embodiment, for providing synchronous signal from the touch sensitive panel to the stylus, the touch sensitive processing apparatus further includes a driving circuit connecting to the processor. The driving circuit is used to send the synchronous signal via at least one of the first electrodes and the second electrodes at the reference timing.

In one embodiment, for providing counting reference of integral timing of the AFE or accumulation-starting reference of sample of the digital back-end, and when the stylus cyclically emits the electrical signal, the processor is further used to perform one of the following steps: recording the timing which the electrical signal starts to be emitted as a reference timing; and recording the timing which the electrical signal stops being emitted as the reference timing, wherein the integral timing of the integrator is a time point of a certain period after the reference timing, or the accumulation-starting sample of the first sensing result or the second sensing result is the sample which starts to be sampled at a certain period after the reference timing.

According to an embodiment of the present invention, it provides a touch sensitive processing method being adaptive to a touch sensitive processing apparatus. The touch sensitive processing apparatus connects with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing method includes: having a sensing circuit of the touch sensitive processing apparatus sense the electrical signal via the first electrodes according to a first sensing parameter to generate multiple first sensing results and sense the electrical signal via the second electrodes according to a second sensing parameter to generate multiple second sensing results; calculating a second coordinate value of the transmitter with respect to the second axis according to the first sensing results; calculating a first coordinate value of the transmitter with respect to the first axis according to the second sensing results; setting the second sensing parameter according to the second coordinate value; and setting the first sensing parameter according to the first coordinate value.

In one embodiment, for adjusting the sensing parameter of the AFE, the sensing circuit further includes an amplifier and an integrator. The first sensing parameter or the second sensing parameter includes one of or any combination of the following parameters: the integral duration of the integrator, the integral timing of the integrator, and the gain coefficient of the amplifier.

According to an embodiment of the present invention, it provides a touch sensitive processing method being adaptive to a touch sensitive processing apparatus. The touch sensitive processing apparatus connects with a touch sensitive panel to detect a stylus emitting an electrical signal on/above the touch sensitive panel. The touch sensitive panel includes multiple first electrodes being parallel to a first axis and multiple second electrodes being parallel to a second axis. The touch sensitive processing method includes: having a sensing circuit of the touch sensitive processing apparatus sense the electrical signal via the first electrodes to generate multiple first sensing results and sense the electrical signal via the second electrodes to generate multiple second sensing results; calculating a second coordinate value of the transmitter with respect to the second axis according to the first sensing results adjusted by a first sensing parameter; calculating a first coordinate value of the transmitter with respect to the first axis according to the second sensing results adjusted by a second sensing parameter; setting the second sensing parameter according to the second coordinate value; and setting the first sensing parameter according to the first coordinate value.

In one embodiment, for adjusting digital back-end sensing parameter, the first sensing parameter or the second sensing parameter includes one of or any combination of the following parameters: the sampling number for each of the first sensing results, the sampling number for each of the second sensing results, the accumulation-starting sample for each of the first sensing results, the accumulation-starting sample for each of the second sensing results, the digital gain value for each of the first sensing results, and the digital gain value for each of the second sensing results.

In one embodiment, for providing initial value of sensing parameter, the touch sensitive processing method further includes one of the following steps: initializing the first sensing parameter firstly when the first coordinate value has not obtained; and initializing the second sensing parameter firstly when the second coordinate value has not obtained.

In one embodiment, for reducing the error of initial value, the initial value of the first sensing parameter is an average value of a maximum value and a minimum value of the first sensing parameter, the initial value of the second sensing parameter is an average value of a maximum value and a minimum value of the second sensing parameter.

In one embodiment, for providing counting reference of integral timing of the AFE, the touch sensitive processing method further includes: sending a synchronous signal to the stylus at a reference timing, wherein the integral timing of the integrator is a time point of a certain period after the reference timing.

In one embodiment, for providing accumulation-starting reference of sample of digital back-end, the touch sensitive processing method further includes: sending a synchronous signal to the stylus at a reference timing, wherein the accumulation-starting sample of the first sensing results or the second sensing results is the sample which starts to be sampled at a certain period after the reference timing.

In one embodiment, for providing synchronous signal from the touch sensitive panel to the stylus, the touch sensitive processing method further includes: having a driving circuit of the touch sensitive processing apparatus send the synchronous signal via at least one of the first electrodes and the second electrodes at the reference timing.

In one embodiment, for providing counting reference of integral timing of the AFE or accumulation-starting reference of sample of the digital back-end, and when the stylus cyclically emits the electrical signal, the touch sensitive processing method further includes one of the following steps: recording the timing which the electrical signal starts to be emitted as a reference timing; and recording the timing which the electrical signal stops being emitted as the reference timing, wherein the integral timing of the integrator is a time point of a certain period after the reference timing, or the accumulation-starting sample of the first sensing result or the second sensing result is the sample which starts to be sampled at a certain period after the reference timing.

According to an embodiment of the present invention, it provides a touch sensitive system including: a touch sensitive panel, including multiple first electrodes being parallel to a first axis and multiple second electrodes being parallel to a second axis; and the abovementioned touch sensitive processing apparatus.

To sum up, the present invention provides a technical solution that the touch sensitive processing apparatus may adjust the setting parameter(s) of the sensing circuit(s) according to the distance of circuit path on which the electrical signal propagating after determining the coordinate of the electrical signal emitted by the stylus. By doing so, the touch sensitive processing apparatus can get signals with better SNR to reduce the error in calculating the coordinates. Moreover, when the electrical signal including the message the stylus intends to transmit, the probability of error in transmitting the message can also be reduced.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus configured to connect with a touch sensitive panel to detect a stylus emitting an electrical signal on the touch sensitive panel, the touch sensitive panel comprising a plurality of first electrodes being parallel to a first axis and a plurality of second electrodes being parallel to a second axis, the touch sensitive processing apparatus comprising:
a sensing circuit, sensing the electrical signal via the first electrodes according to a first sensing parameter to generate a plurality of first sensing results and sensing the electrical signal via the second electrodes according to a second sensing parameter to generate a plurality of second sensing results; and
a processor connecting with the sensing circuit, reading and executing a program from a non-volatile memory, the program comprising a plurality of instructions executed by the processor for performing the following steps:
calculating a second coordinate value of the transmitter with respect to the second axis according to the first sensing results;
calculating a first coordinate value of the transmitter with respect to the first axis according to the second sensing results;
setting the second sensing parameter according to the second coordinate value; and
setting the first sensing parameter according to the first coordinate value.

2. The touch sensitive processing apparatus according to claim 1, wherein the sensing circuit further comprises an amplifier and an integrator, the first sensing parameter or the second sensing parameter comprises one of or any combination of the following parameters:
the integral duration of the integrator;
the integral timing of the integrator; and
the gain coefficient of the amplifier.

3. The touch sensitive processing apparatus according to claim 2, wherein the processor is further used to perform the following steps:
sending a synchronous signal to the stylus at a reference timing, wherein the integral timing of the integrator is a time point of a certain period after the reference timing.

4. The touch sensitive processing apparatus according to claim 2, wherein the stylus cyclically emits the electrical signal, the processor is further used to perform one of the following steps:
recording the timing which the electrical signal starts to be emitted as a reference timing; and
recording the timing which the electrical signal stops being emitted as the reference timing,
wherein the integral timing of the integrator is a time point of a certain period after the reference timing, or the accumulation-starting sample of the first sensing results or the second sensing results is the sample which starts to be sampled at a certain period after the reference timing.

5. The touch sensitive processing apparatus according to claim 1, wherein the processor is further used to perform one of the following steps:
initializing the first sensing parameter firstly when the first coordinate value has not been obtained; and
initializing the second sensing parameter firstly when the second coordinate value has not been obtained.

6. A touch sensitive system, comprising:
the touch sensitive panel and the touch sensitive processing apparatus according to claim 1.

7. A touch sensitive processing apparatus configured to connect with a touch sensitive panel to detect a stylus emitting an electrical signal on the touch sensitive panel, the touch sensitive panel comprising a plurality of first electrodes being parallel to a first axis and a plurality of second electrodes being parallel to a second axis, the touch sensitive processing apparatus comprising:
a sensing circuit, sensing the electrical signal via the first electrodes to generate a plurality of first sensing results and sensing the electrical signal via the second electrodes to generate a plurality of second sensing results; and
a processor connecting with the sensing circuit, reading and executing a program from a non-volatile memory, the program comprising a plurality of instructions executed by the processor for performing the following steps:
calculating a second coordinate value of the transmitter with respect to the second axis according to the first sensing results adjusted by a first sensing parameter;
calculating a first coordinate value of the transmitter with respect to the first axis according to the second sensing results adjusted by a second sensing parameter;
setting the second sensing parameter according to the second coordinate value; and
setting the first sensing parameter according to the first coordinate value.

8. The touch sensitive processing apparatus according to claim 7, wherein the first sensing parameter or the second sensing parameter comprises one of or any combination of the following parameters:
the sampling number for each of the first sensing results;
the sampling number for each of the second sensing results;
the accumulation-starting sample for each of the first sensing results;
the accumulation-starting sample for each of the second sensing results;
the digital gain value for each of the first sensing results; and
the digital gain value for each of the second sensing results.

9. The touch sensitive processing apparatus according to claim 8, wherein the processor is further used to perform the following steps:
sending a synchronous signal to the stylus at a reference timing, wherein the accumulation-starting sampling sample of the first sensing result or the second sensing result is the sampling sample which starts to be sampled at a certain period after the reference timing.

10. The touch sensitive processing apparatus according to claim 9, further comprising:
a driving circuit connecting to the processor, used to send the synchronous signal via at least one of the first electrodes and the second electrodes at the reference timing.

11. The touch sensitive processing apparatus according to claim 8, wherein the stylus cyclically emits the electrical signal, the processor is further used to perform one of the following steps:
recording the timing which the electrical signal starts to be emitted as a reference timing; and
recording the timing which the electrical signal stops being emitted as the reference timing,
wherein the integral timing of the integrator is a time point of a certain period after the reference timing, or the accumulation-starting sampling sample of the first sensing results or the second sensing results is the sampling sample which starts to be sampled at a certain period after the reference timing.

12. The touch sensitive processing apparatus according to claim 7, wherein the processor is further used to perform one of the following steps:
initializing the first sensing parameter firstly when the first coordinate value has not been obtained; and
initializing the second sensing parameter firstly when the second coordinate value has not been obtained.

13. The touch sensitive processing apparatus according to claim 12, wherein the initial value of the first sensing parameter is an average value of a maximum value and a minimum value of the first sensing parameter, the initial value of the second sensing parameter is an average value of a maximum value and a minimum value of the second sensing parameter.

14. A touch sensitive system, comprising:
the touch sensitive panel and the touch sensitive processing apparatus according to claim 7.

15. A touch sensitive processing method being adaptive to a touch sensitive processing apparatus, the touch sensitive processing apparatus connecting with a touch sensitive panel to detect a stylus emitting an electrical signal on the touch sensitive panel, the touch sensitive panel comprising a plurality of first electrodes being parallel to a first axis and a plurality of second electrodes being parallel to a second axis, the touch sensitive processing method comprising:
having a sensing circuit of the touch sensitive processing apparatus sense the electrical signal via the first electrodes according to a first sensing parameter to generate a plurality of first sensing results and sense the electrical signal via the second electrodes according to a second sensing parameter to generate a plurality of second sensing results;
calculating a second coordinate value of the transmitter with respect to the second axis according to the first sensing results;
calculating a first coordinate value of the transmitter with respect to the first axis according to the second sensing results;
setting the second sensing parameter according to the second coordinate value; and
setting the first sensing parameter according to the first coordinate value.

16. The touch sensitive processing method according to claim 15, wherein the sensing circuit further comprises an amplifier and an integrator, the first sensing parameter or the second sensing parameter comprises one of or any combination of the following parameters:
the integral duration of the integrator;
the integral timing of the integrator; and
the gain coefficient of the amplifier.

17. The touch sensitive processing method according to claim 16, further comprising:
sending a synchronous signal to the stylus at a reference timing, wherein the integral timing of the integrator is a time point of a certain period after the reference timing.

18. The touch sensitive processing method according to one of claim 15, further comprising one of the following steps:
initializing the first sensing parameter firstly when the first coordinate value has not been obtained; and
initializing the second sensing parameter firstly when the second coordinate value has not been obtained.

19. The touch sensitive processing method according to claim 15, further comprising one of the following steps:
recording the timing which the electrical signal starts to be emitted as a reference timing; and
recording the timing which the electrical signal stops being emitted as the reference timing,
wherein the integral timing of the integrator is a time point of a certain period after the reference timing, or the accumulation-starting sampling sample of the first sensing results or the second sensing results is the sampling sample which starts to be sampled at a certain period after the reference timing.

20. A touch sensitive processing method being adaptive to a touch sensitive processing apparatus, the touch sensitive processing apparatus connecting with a touch sensitive panel to detect a stylus emitting an electrical signal on the touch sensitive panel, the touch sensitive panel comprising a plurality of first electrodes being parallel to a first axis and a plurality of second electrodes being parallel to a second axis, the touch sensitive processing method comprising:
having a sensing circuit of the touch sensitive processing apparatus sense the electrical signal via the first electrodes to generate a plurality of first sensing results and sense the electrical signal via the second electrodes to generate a plurality of second sensing results;

calculating a second coordinate value of the transmitter with respect to the second axis according to the first sensing results adjusted by a first sensing parameter;

calculating a first coordinate value of the transmitter with respect to the first axis according to the second sensing results adjusted by a second sensing parameter;

setting the second sensing parameter according to the second coordinate value; and setting the first sensing parameter according to the first coordinate value.

21. The touch sensitive processing method according to claim 20, wherein the first sensing parameter or the second sensing parameter comprises one of or any combination of the following parameters:

the sampling number for each of the first sensing results;

the sampling number for each of the second sensing results;

the accumulation-starting sample for each of the first sensing results;

the accumulation-starting sample for each of the second sensing results;

the digital gain value for each of the first sensing results; and the digital gain value for each of the second sensing results.

22. The touch sensitive processing method according to claim 21, further comprising:

sending a synchronous signal to the stylus at a reference timing, wherein the accumulation-starting sample of the first sensing results or the second sensing results is the sample which starts to be sampled at a certain period after the reference timing.

23. The touch sensitive processing method according to claim 22, further comprising:

having a driving circuit of the touch sensitive processing apparatus send the synchronous signal via at least one of the first electrodes and the second electrodes at the reference timing.

24. The touch sensitive processing method according to claim 20, further comprising one of the following steps:

initializing the first sensing parameter firstly when the first coordinate value has not obtained; and initializing the second sensing parameter firstly when the second coordinate value has not obtained.

25. The touch sensitive processing method according to claim 24, wherein the initial value of the first sensing parameter is an average value of a maximum value and a minimum value of the first sensing parameter, the initial value of the second sensing parameter is an average value of a maximum value and a minimum value of the second sensing parameter.

* * * * *